J. R. Bragg.
Spring Saddle Tree.
N° 90,990.    Patented Jun. 8, 1869.
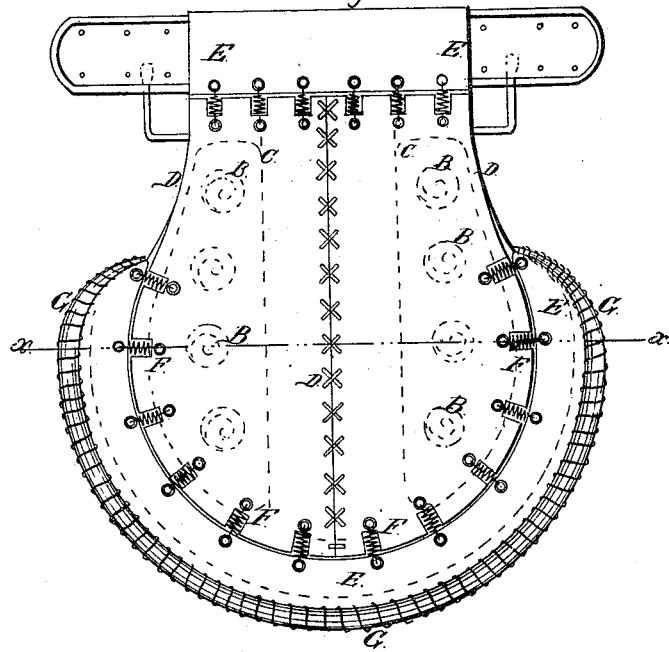
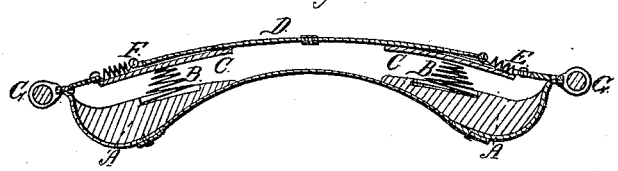
Witnesses.    Inventor
Geo. W. Mabee    J. R. Bragg
Oscar Finchman    pr Munn & Co
    Attorneys.

UNITED STATES PATENT OFFICE.

JOHN R. BRAGG, OF WILLIAMSBURG, MISSOURI.

IMPROVED SPRING SADDLE-TREE.

Specification forming part of Letters Patent No. 90,990, dated June 8, 1869.

*To all whom it may concern:*

Be it known that I, JOHN R. BRAGG, of Williamsburg, in the county of Callaway and State of Missouri, have invented a new and Improved Spring Saddle-Tree; and I do hereby declare that the following is a full, clear, and exact description thereof, which will enable others skilled in the art to make and use the same, reference being had to the accompanying drawings, forming part of this specification, in which—

Figure 1 is a top or plan view of my improved spring saddle-tree. Fig. 2 is a detail cross-section of the same, taken through the line $x\ x$, Fig. 1.

Similar letters of reference indicate corresponding parts.

My invention has for its object to furnish an improved spring saddle-tree which shall be simple in construction, while forming an easy and comfortable seat; and it consists in the construction and combination of the various parts, as hereinafter more fully described.

A represents the wooden tree of the saddle, to the upper sides of the side bars of which are attached coiled springs B, which said springs should be set in sockets in the bars of the tree A, so that when fully compressed the springs may sink down into the said sockets to leave a smooth seat to the saddle. To enable this to be done more readily the springs are so formed that when compressed their coils may sink down one within the other. The upper ends of the springs B are securely riveted to sheet-metal plates C, which thus support the ends of the springs and keep them from being pressed out of shape or place. The plates C are covered with a piece of sole or other thick leather, D, which may be made in one piece or in two pieces laced to each other, as shown in Fig. 1. The leather D may be pressed or otherwise drawn into the desired shape. The edges of the leather D are connected with the edges of the leather E attached to tree A by coiled springs F, as shown in Figs. 1 and 2. In the case of large saddles the springs F may be made half-round, and their convex parts sunk into recesses formed for their reception in the wooden part of the saddle, so that they may present a smooth upper surface.

G is a roll of coiled wire placed upon and secured to the cantle of the saddle, which, when a seat of heavy leather is drawn over the saddle, gives elasticity to said seat and prevents the springs B and F from being deadened by said seat. The roll G should be covered with thick soft leather.

Having thus described my invention, what I claim as new, and desire to secure by Letters Patent, is—

The combination of the coiled springs B and F and sheet-metal plates C with the tree A and leather D, substantially as herein shown and described, and for the purpose set forth.

JOHN R. BRAGG.

Witnesses:
 B. B. TUREMAN,
 JOHN C. H. BROADWATER.